United States Patent Office 2,927,887
Patented Mar. 8, 1960

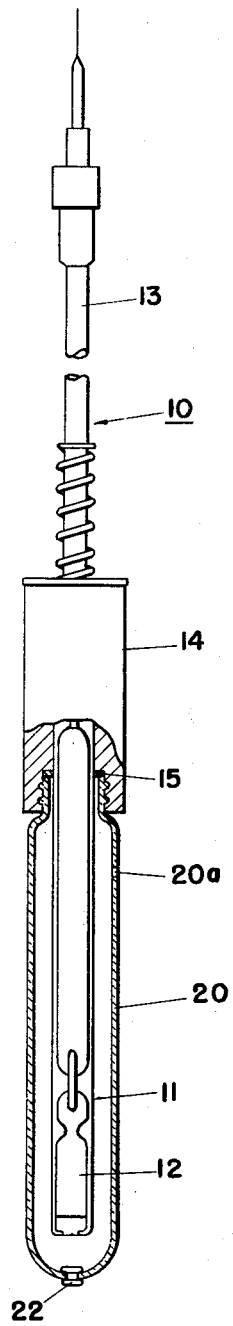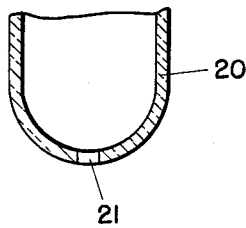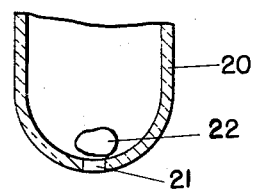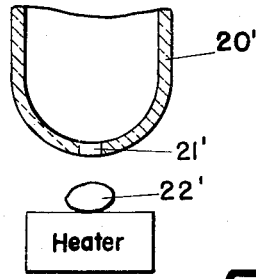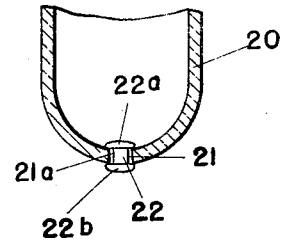

2,927,887

PLASTIC SALT-BRIDGE JUNCTIONS

William E. Proctor, Jr., Philadelphia, Pa., assignor to Leeds and Northrup Company, Philadelphia, Pa., a corporation of Pennsylvania Application August 29, 1957, Serial No. 681,083

7 Claims. (Cl. 204—195)

This invention relates to salt-bridge tubes such as employed with reference electrodes, ion-concentration cells or the like and has for an object the forming of a minute passage for the salt-bridge connection in a salt-bridge tube from inert plastic material. It is a further object of this invention to provide a salt-bridge tube with a salt-bridge connection formed from a plastic material and of relatively sturdy construction so as not to be damaged through usage and shaped to resist removal from the tube.

In accordance with the invention, there is provided a salt-bridge tube having a wall of non-conductive material with a hole therethrough and a plastic structure in the hole and extending through the wall. The plastic structure has a pair of integral flanges, one engaging each of the opposite sides of the wall adjacent the hole, the flanges being of sufficient area to retain the plastic structure in the hole in avoidance of accidental displacement therefrom. The plastic structure is formed from a material having a coefficient of thermal expansion substantially different from that of the wall, so that the plastic structure cooperates with the wall to form a minute passageway between the wall and the plastic structure to connect the opposite sides of the wall and provide a salt-bridge connection. The plastic structure may be formed from suitable materials, such, for example, as polyethylene, fluorocarbon resins, or the like.

For further objects and advantages of the invention and for a more detailed disclosure thereof, reference is to be had to the following description taken in conjunction with the accompanying drawings in which:

Fig. 1 diagrammatically illustrates in section a reference cell incorporating a salt-bridge tube utilizing the present invention;

Fig. 2 is a sectional view of a supporting tube with a hole in the end thereof adapted to receive a plastic rivet;

Figs. 3 and 4 are diagrammatic views illustrating different methods of forming the plastic rivet in the hole in the supporting tube; and Fig. 5 is a sectional view, on enlarged scale, showing the plastic rivet in place in the supporting tube.

In general, systems of the type to which the present invention is applicable will include a measuring or pH-responsive electrode and a reference electrode. Examples of such systems are disclosed in Perley Patents Nos. 2,108,293, 2,345,498 and 2,563,062. This invention is particularly directed to the reference electrode assembly or half-cell, an example of which is shown in Fig. 1.

The reference electrode assembly 10, aside from the novel salt-bridge connection, is of conventional construction and includes an electrode 11 having at its lower end a calomel paste 12 which includes a finely divided mercury. The electrode 11 is connected to a suitable measuring system, not shown, as by a conductor 13 which extends through a cap member 14. The electrode 11 is disposed in a salt-bridge tube 20 which has a small breather hole 20a near the top of tube 20. The tube 20 is adapted to receive a suitable salt-bridge solution, such as a saturated KCl solution, in sufficient amount so that when the electrode 11 is inserted, the solution level will be below the small breather opening 20a. The upper end of tube 20 is threaded so it may be screwed into the cap 14 to seat firmly against a Neoprene washer 15. At the lower end of the tube 20 is a novel salt-bridge connection formed by a plastic rivet-like structure or plug 22 which extends through an opening 21 in the tube 20, as later to be described more in detail. The lower end of tube 20 is adapted to be immersed into the solution being measured to a depth so that there is outward flow of solution.

In the past in ion concentration or pH measuring systems, the path for providing for electrical conduction between the salt-bridge solution and the test solution has taken various forms such as wicks, ground joints, fibers, agar-gel connections, small-bore tubes and various others, all of which are subject to certain serious disadvantages, as well known in the art. Probably the two most frequently used forms, at least in recent years, are the fused glass plug type described in Perley Patent No. 2,345,498 and a metal plug type described in Arthur Patent No. 2,705,220. While both of these types have been used extensively, nevertheless, they are subject to certain disadvantages and limitations. In the fused glass construction there is a resulting crack formed in the glass, and such crack tends to weaken the tube at that location. Furthermore, inasmuch as both the tube and plug are formed from glass, they are relatively fragile and care must be taken not to dislodge the glass plug from the end of the tube. This latter precaution must also be taken in connection with the metal plug constructions as they are even more subject to dislocation than the glass plugs. In addition, the metal plug constructions are subject to limitation as to many types of solutions, such as oxidation-reduction solutions where in such environments the metal plug causes erroneous voltage readings. Other solutions in which the metal plug type units are not recommended include photographic solutions, cold wave solutions, plating solutions, very strong reducing agents, peroxides and strong metal complexing agents.

These foregoing disadvantages have been completely overcome in accordance with the present invention, where the plug in the tube has been constructed from a plastic material which has the characteristic of being chemically inert with respect to solutions, and in addition has the mechanical strength characteristic whereby it resists damage or displacement from the tube after it is inserted.

One method of making the plastic salt-bridge junctions in accordance with the present invention is disclosed in Fig. 3. The supporting tube 20 is disposed vertically with hole or opening 21 at the lower end. A plastic pellet 22 is disposed inside the tube 20 and over the hole 21. The pellet 22 is heated by a suitable source, not shown, to a temperature sufficient to cause it to flow by gravity into the hole 21. The temperature to which the plastic is heated is below the melting temperature of the tube 20. While the plastic material is hot, it is manipulated as it flows through the hole 21 to form a rivet-like structure with end flanges 22a and 22b respectively adjacent the inner and outer walls of the tube 20 and as shown in Fig. 5. While the plastic material 22 is hot, it closes the hole 21 at the end of tube 20 but after it cools, the plastic rivet-like structure produces a minute passage between the latter and the tube by reason of the difference of the coefficient of expansion of the plastic material and of the material from which the tube is made. The plastic material has a coefficient of expansion several times greater than the material from which the tube 20 is made. For example, the supporting tube 20 is usually made from an inert non-conductive material such as glass. When the plastic material cools, there is formed an opening around the circumference of the plastic rivet in the hole 21 and between the rivet and wall of the supporting tube 20.

Another method for forming a plastic salt-bridge connection in accordance with the present invention is illustrated in Fig. 4. In this method, a pellet of plastic material 22' is heated to its flow temperature and the cold supporting tube 20' is placed over the hot plastic material with the hole 21' in the tube 20' in alignment with the plastic material 22'. By moving the tube 20' downwardly into contact with the plastic material 22', the latter is caused to enter and close the hole 21' to an extent sufficient to form flanges of the plastic material on the opposite sides of the wall of the tube and around the hole. These flanges are illustrated in Fig. 5 by reference characters 22a and 22b. When the rivet-like structure formed from the plastic material is cooled, there is produced a minute passage 21a around the plastic structure and through the hole 21. This passage is of dimension sufficient for permitting leakage rates in the order of 1 to 2 milliliters per day with a liquid head of about 2".

The foregoing methods have been found to produce satisfactory salt-bridge junctions with various types of plastic materials, such, for example, as polyethylene, fluorocarbon resins and nylon. Of the fluorocarbon resins, the form identified as polychlorotrifluoroethylene and sold under the traemark "Kel-F" has been found to be particularly suitable.

The amount of plastic material utilized in the formation of the rivet-like structure is in the order of 0.008 cubic centimeter. While the foregoing quantity is not critical, it is important that there should be sufficient plastic material to fill the hole 21 in the tube. Also, to form flanges of the rivet on the inner and outer surfaces of the tube, it might be expected that the plastic rivets would completely close and plug the holes in the supporting tubes when exposed to high operating temperatures. However, this was found not to be the case. It was found that within a wide working range of from about 2° C. to 90° C. the minute passage annulus formed betweed the plastic rivet and the tube remained open and the junction functioned satisfactorily. The mobilities of the conducting ions K+ and Cl− increased markedly with temperature, thus lowering the electrical resistance. Ionic velocities increase about 2 to 2.5 percent for every degree rise in temperature. This effect opposes the diminution of the orifice resulting from the thermal expansion of the plastic in glass. It was also found that after the salt-bridge tubes had been subjected to the range of temperatures from 2° C. to 90° C., the resistance values of the junctions returned to the previously obtained room temperature values when the temperature was returned to room temperature or about 25° C.

As may be seen in Fig. 5, the flanges 22a and 22b serve to hold the plastic rivet firmly in place in the end of the supporting tube 20. As the plastic material from which the rivet is formed is of relatively high mechanical strength and resistant to breakage, it insures that the junction will not be accidentally dislodged due to rough handling or otherwise. Inasmuch as the plastic material is of higher mechanical strength than the glass supporting tube, the tube will be broken before the junction is dislodged from the end of the tube.

For satisfactory results, it was found that the tube 20 or 20' should have a hole 21 or 21' of diameter in the order of $\frac{1}{32}$ inch. This dimension does not change during the formation of the plastic rivet in the tube, as the temperature to which the plastic is subjected during the operation is less than the melting temperature of the glass.

The following table indicates the temperature and expansion characteristics of the glass of the supporting tube when formed of a Pyrex glass and also of various types of suitable plastic rivets.

Table

| Material | Tube glass (Pyrex) | Rivet Kel-F | Rivet polyethylene | Rivet nylon |
| --- | --- | --- | --- | --- |
| Coefficient,° C. of linear expansion. | $32 \times 10^{-7}$ | $450$–$700 \times 10^{-7}$ | $1{,}600$–$1{,}800 \times 10^{-7}$ | $1{,}000$–$1{,}500 \times 10^{-7}$. |
| Flow temperature | melting 820° C | 211° C | 95° C.–105° C | 160° C. |
| Effect of alkalies | slight attack | none | very resistant | none. |
| Effect of weak acids | none | ----do---- | ----do---- | resistant. |
| Effect of strong acids | ----do---- | ----do---- | slow attack by oxidizing agents. | attacked. |

As may be seen from the table, the rivets made from "Kel-F" are extremely inert to chemicals, and alkalies or acids, whether weak or strong, have no effect on them. The next most suitable material for formation of the rivet structures was polyethylene. This material, while very resistant to the effect of alkalies and weak acids, is subject to slow attack by oxidizing agents, and thus for some applications is less desirable than the preferred Kel-F or other equivalent fluorocarbon resins.

What is claimed is:

1. A salt-bridge tube having a wall of non-conductive material with a hole therethrough, said material having properties of chemical inertness, high flow-temperature and coefficient of thermal expansion similar to that of glass, a plastic structure in said hole and extending through said wall, said plastic structure having a pair of integral flanges one engaging each of the opposite sides of said wall adjacent said hole, said flanges being of sufficient area to retain said plastic structure in said hole in avoidance of accidental displacement therefrom, said plastic structure being formed from a material having a coefficient of thermal expansion several times that of the wall so that said plastic structure cooperates with said wall to form a minute passageway between said wall and said plastic structure to connect the opposite sides of said wall and provide a salt-bridge connection.

2. A salt-bridge tube having a wall of non-conductive material with a hole therethrough, a plastic structure in said hole and extending through said wall, said material being chemically inert and having properties of high flow-temperature and low coefficient of thermal expansion as compared with said plastic structure, said plastic structure cooperating with said wall to form a minute passageway connecting opposite sides of said wall and providing a liquid junction, said plastic structure being provided with with a flange disposed on the inside of said tube to prevent said plastic structure from falling through said hole, and said plastic structure being provided with a flange at the outer surface of said tube for preventing said plastic structure from being forced inwardly of said tube.

3. A salt-bridge tube according to claim 2 wherein said plastic structure is formed from polyethylene.

4. A salt-bridge tube according to claim 2 wherein said plastic structure is formed from a fluorocarbon resin.

5. A salt-bridge tube according to claim 4 wherein said plastic structure is formed from polychlorotrifluoroethylene.

6. A salt-bridge tube having a wall of glass with a hole therethrough, a plastic structure in said hole and extending through said wall, said plastic structure having a pair of integral flanges, one engaging each side of said wall adjacent said hole, said flanges being of sufficient area to retain said plastic structure in said hole in avoidance of accidental displacement therefrom, said plastic structure being formed from a material having a coefficient of thermal expansion several times that of the glass so that said plastic structure cooperates with said glass wall to form a minute passageway between said glass wall and said plastic structure to connect the opposite sides of said wall and provide a salt-bridge connection.

7. A salt-bridge tube having a wall of glass with a hole therethrough, and for a salt-bridge connection a rivet-like structure of plastic forming a closure for said hole, said plastic having a coefficient of thermal expansion several times greater than that of said glass wall, said closure permitting KCl solution leakage rates in the order of 1 to 2 milliliters per day with a 2" head of solution.

References Cited in the file of this patent

UNITED STATES PATENTS

| | | |
|---|---|---|
| 2,252,504 | Hahn | Aug. 12, 1941 |
| 2,697,070 | Arthur | Dec. 14, 1954 |
| 2,705,220 | Arthur | Mar. 29, 1955 |
| 2,705,346 | Schlabach et al. | Apr. 5, 1955 |